United States Patent [19]

Hopkins et al.

[11] 4,161,786

[45] Jul. 17, 1979

[54] DIGITAL BUS COMMUNICATIONS SYSTEM

[75] Inventors: Gregory T. Hopkins, Chelmsford; Ashraf M. Dahod, Reading; Victor A. Demarines, Chelmsford; Norman B. Meisner, Newton Centre; David G. Willard, Carlisle, all of Mass.

[73] Assignee: The Mitre Corporation, Bedford, Mass.

[21] Appl. No.: 881,704

[22] Filed: Feb. 27, 1978

[51] Int. Cl.² ........................ G06F 3/00; H04J 3/04
[52] U.S. Cl. ........................... 364/900; 179/15 BY
[58] Field of Search ... 364/200 MS File, 900 MS File; 179/15 BY, 15 BA, 15 BV, 15 AL

[56] References Cited

U.S. PATENT DOCUMENTS

| 3,665,404 | 5/1972 | Werner | 364/200 |
|---|---|---|---|
| 3,710,324 | 1/1973 | Cohen et al. | 364/200 |
| 3,851,104 | 11/1974 | Willard et al. | 179/15 BY |
| 4,038,642 | 7/1977 | Bouknecht et al. | 364/200 |
| 4,038,644 | 7/1977 | Duke et al. | 364/900 |
| 4,041,473 | 8/1977 | Bardotti et al. | 364/200 |
| 4,087,643 | 5/1978 | Joslow et al. | 179/15 BY |

OTHER PUBLICATIONS

De Smet et al., "'Pacuit' Switching Combines Two Techniques in One Network", *Computer Design*, Jun. 1976, pp. 83–88.
Buckley, "Dynamic Multiplexing Applications", *Computer Design*, Nov. 1976, pp. 14–18.
DeMarines et al., "The Cable Bus in Data Communications", *Datamation*, Aug. 1976.

*Primary Examiner*—Leo H. Boudreau
*Attorney, Agent, or Firm*—Kenway & Jenney

[57] ABSTRACT

A time division multiple access communications system includes a plurality of terminals coupled to a common signal path, or bus. In one form of the invention, time slots are allocated on a relatively static basis to various requesting terminals to establish communication links over the bus. Control of bus access and communication link formation is distributed over the entire system, wherein at least one terminal having the slot allocation capability may address selected other terminals and allocate the capability among those other terminals. In a second form, subscriber terminals contend for access to the bus. In a third form, a dual mode communication system is provided incorporating both the allocation and contention modes of operation.

46 Claims, 16 Drawing Figures

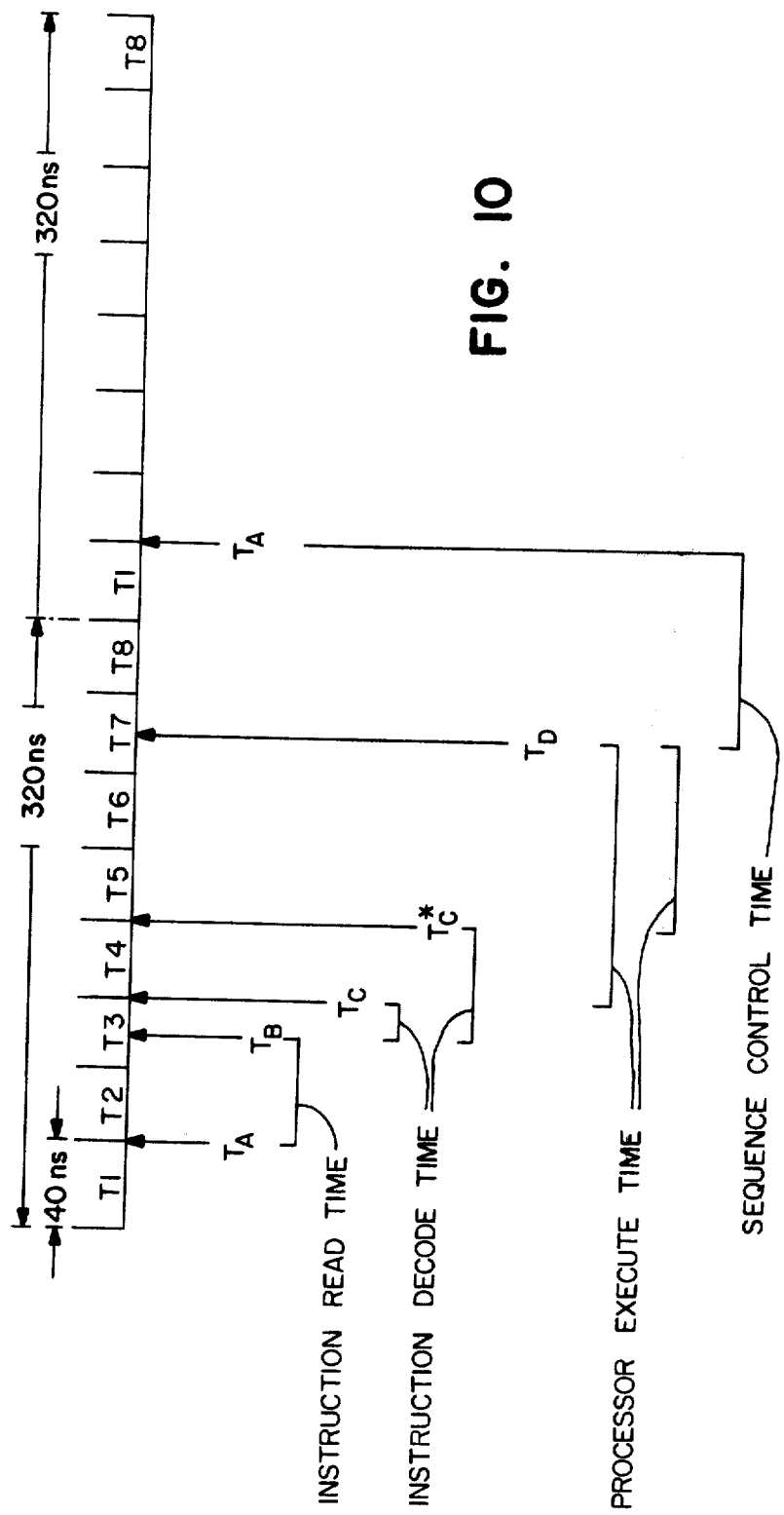

DIGITAL BUS COMMUNICATIONS SYSTEM

REFERENCE TO RELATED PATENT

The present application is related to U.S. Pat. No. 3,851,104 to David G. Willard, Michael S. Cogan, Maurice G. Vacherot and John W. Shay, issued Nov. 26, 1974. This patent is incorporated by reference into the present application.

BACKGROUND OF THE INVENTION

The field of this invention is communications systems, and more particularly, time division multiple access digital bus communications systems.

There are many forms of multiple access communications systems known in the art, including for example, the time division system disclosed in the incorporated reference. These systems basically provide an information bus for transferring digital message signals between remote terminals. In the prior art systems, there are a number of protocols utilized to accommodate the various terminals in the network and provide them with access to a communications bus. Such protocols include simple polling, priority request, contention, and cyclic time division with fixed slot allocations.

In the polling type systems, a central controller sequentially polls each of the remote terminals, offering each an opportunity to access the communications bus when available. In priority request systems, remote terminals ready to transmit a message make a request, and are granted access to the bus according to priorities established by a bus arbiter at a central controller. In contention systems, remote terminals may transmit messages at random times, monitor the signals on the bus, and subsequently re-transmit in the event two or more simultaneous transmissions are detected.

The polling and priority request approaches have been applied to time division systems in the prior art whereby a central terminal controls the bus access. However, such systems are typically characterized by a rigid formating of messages and an inflexible set of system constraints controlling the time periods at which the various remote terminals may gain access to the communication path. In addition, the various data rates at which the individual remote terminals may transmit message signals are hard-wired into the systems to define predetermined portions of the channel bandwidth which are allocated to each of the remote terminals.

The cyclic time division systems, including that disclosed in the incorporated reference, dedicate regularly occurring time slots in a repetitive framed sequence to specific users for their transmissions, and hence, may be referred to as a fixed slot allocation system. In the system described in the incorporated reference, the slot allocations may be tailored somewhat to specific user requirements through the procedure whereby remote terminals may request certain portions of the bus spectrum in predetermined access request time slots. In this system, a central controller then allocates families of message time slots to the requesting terminals in accordance with various parameters, such as predetermined priorities, time slot availabilities, and the like.

The system described in the incorporated reference overcomes these disadvantages to a large extent by permitting dynamic allocation of time slots in order to accommodate desired access time and data rate variations. However, in the referenced systems, all the control is achieved at a central terminal, which must control bus access and link formation for the entire system. Consequently, the level of complexity for that control terminal is relatively high. In addition, outage of that central terminal causes failure of the entire system.

Typically, in operating environments, a system is required to accommodate high duty cycle subscribers, low duty cycle subscribers, and combinations of both. The high duty cycle subscribers, such as inter-computer links, have generally been accommodated in the prior art by the cyclic time division systems wherein the various subscribers are assigned fixed slot allocations in the repetitive time framed time sequence on the bus. The low duty cycle, or bursty, subscribers, such as communications terminals, have been accommodated in the prior art by unslotted contention type systems, where the entire bus bandwidth is allocated to a single subscriber. Although these types of systems are specifically tailored for the particular types of subscribers, neither system type optimally accommodates both high and low duty cycle subscribers.

Accordingly, it is an object of the present invention to provide a time division multiple access communications system in which control of bus access and communication link formation is distributed over a plurality of terminals in the system.

It is another object to provide a time division multiple access communications system in which subscriber terminals contend for transmission time slots.

A further object is to provide a time division multiple access communications system which accommodates both high and low duty cycle subscribers by controlling slot allocations and contention slot transmissions.

SUMMARY OF THE INVENTION

Briefly, the present invention provides a time division multiple access communications system including a plurality of terminals coupled to a common signal path, or bus. Communication links are established over the path between one or more of the terminals wherein digital signals may be transferred in time slots in a repetitive framed sequence between linked terminals.

In one form of the invention, selected time slots within the framed sequence are allocated on a relatively static basis to various requesting terminals to establish the link. In accordance with the invention, the slot allocation function may be distributed over the entire system, wherein at least one terminal having the slot allocation capability may address selected other terminals and allocate that slot allocation capability among those selected other terminals. Thereafter, the signal path bandwidth may be effectively allocated by either the primary terminal or the selected other terminals, permitting a flexible, dynamic allocation of the system bandwidth. The primary slot allocating terminal may accordingly address selected ones of the other terminals, and may transfer data to those terminals representative of the identity of an allocated one or more unused time slots which may be allocated by those selected terminals to the various other terminals coupled to the path. In this form, the administration workload for the system may be distributed so that no single terminal is required to perform all of the bus access control functions. The system may efficiently accommodate relatively high usage and priority subscriber terminals with a desired portion of the signal path bandwidth, while controlling the mean time to access the signal path for the remaining terminals.

In a second form, the present invention provides a slotted time division system wherein the various subscriber terminals contend for access to the signal path. In this form, the common signal path includes one or more pairs of oppositely directed unidirectional signal paths connecting each of the terminals. A connector network at a central location is adapted to receive signals from time slots along the paths inbound to that connector, and to transfer those signals to the paths outbound from that connector network in corresponding time slots associated with that outbound path. The entire signal path bandwidth is allocated to a single terminal at a time. Each terminal with this contention capability is operative to transmit a message signal in the slots on the inbound path, and then monitors the outbound path to detect the presence of that transmitted signal.

The connector detects signal collisions (from two or more terminals) in the various time slots on the inbound path, and when such a collision is detected, the connector network inhibits the transfer of signals from the inbound path to the outbound path. Thus, when a collision is detected, no slot signal is transferred to the outbound path and the transmitting terminal is unable to confirm that its transmission was successful (i.e. avoided collision). In this configuration, the connector also includes a retransmit time signal generator for transmitting on the outbound path signals addressed to the various remote terminals and including data for controlling the selection of a re-transmission time slot by the transmitting terminal. The transmitting terminal is responsive to that signal to select a subsequent time slot for commencing the re-transmission of the message. The process repeats until the transmitting terminal gains access (without collision) to the signal path. This second form of the invention is particularly well suited to low duty cycle, or bursty, subscriber terminals.

In a third form of the invention, a dual mode communication system is provided wherein certain of the time slots on the signal path are controlled for use in dynamic allocation operation with relatively static slot assignments (in conjunction with a set of terminals adapted for dynamic allocation) in the manner described above for the first form of the invention, and a second set of time slots in the signal path are adapted to be used by terminals operating in accordance with the contention form of the invention described above. In this third form, the ratio of use of time slots between the allocation and contention mode of operation may be adaptively controlled in the form of the number of time slots allocated for each function, or by means of the mode of operation for the various terminals and ratio of such terminals connected to the system. In this third form, the dual mode system may be dynamically varied to accommodate any desired current usage of both bursty (low duty cycle) and longterm (high duty cycle) subscriber terminals. Typically, computers are high duty cycle users and receive dedicated slot assignments which may be varied according to priorities through the allocation of the varying numbers of slots per frame to the particular terminals. Low duty cycle or bursty users, like communication terminals, are each given the same slot assignments and contend for transmission in that set of slots. In this third form, each type of subscriber may communicate with any subscriber of either type since the data message formats are identical.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 10 shows the operational cycle for microcontroller of FIG. 8;

DESCRIPTION OF THE PREFERRED EMBODIMENT

Figure 1:
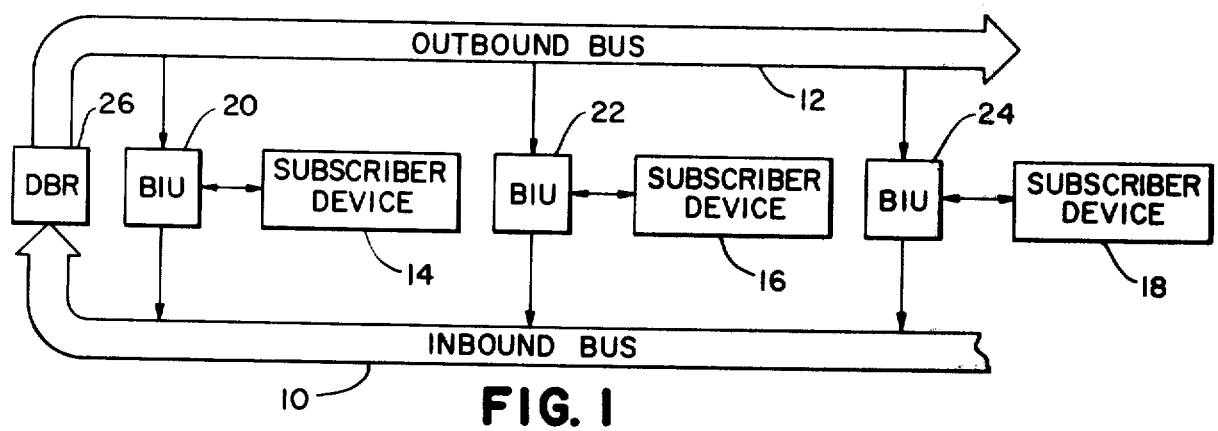
FIG. 1 shows in block diagram form a communications system in accordance with the invention.

A high speed time division multiple access (TDMA) digital communications system is shown in block diagram form in FIG. 1. The system includes a common signal path comprising inbound bus 10 and outbound bus 12, and a set of addressed subscriber devices coupled to the buses 10 and 12. As shown, the set includes subscriber devices 14, 16 and 18. Each subscriber device is coupled to both inbound bus 10 and outbound bus 12 by a respective one of bus interface units (BIU's) 20, 22 and 24. In alternative embodiments, a plurality of subscriber devices may be coupled to the bus by each of the BIU's, and different numbers of subscriber devices and associated BIU's may be coupled to the buses. The present system is adapted to provide a transfer of digital signals between subscriber devices coupled to the common signal path in one or more time slots in a repetitive framed sequence.

In the present embodiment, the inbound bus 10 and outbound bus 12 comprise oppositely-directed unidirectional digital signal paths coupled at a system head-end by a digital bus repeater (DBR) 26. By way of example, the inbound bus 10 and outbound bus 12 may be separate channels on a conventional wideband distribution system, such as a two cable television (CATV) trunk-/feeder network. In alternative embodiments, the common signal path may comprise a bidirectional signal path coupling each of the subscriber devices.

Each BIU is adapted to transmit a serial bit stream in selected time slots on the inbound bus 10, and to receive a continuous serial bit stream from the outbound bus 12.

The BIU's provide access to the data bus for their associated devices and establish electrical and functional capabilities between the buses and the respective subscribers.

The data bus repeater (DBR) 26 is a connector network which receives inbound data on bus 10, retimes and reformats such data with a one slot delay, and retransmits it under control of a master clock onto the outbound bus 12. The retransmitted data is available for reception by all BIU's coupled to bus 12.

In operation, the buses carry digital signals in time slots in the repetitive frame sequence. As described more fully below, the time slot signals may be either of two types, control or message. Control type signals transfer control data between BIU's which is processed to establish various control functions for the system (such as monitoring status, or establishing a communication link between terminals). Message type signals transfer message data between terminals, generally for intersubscriber communication purposes. In general, in addition to the control or message data, each signal on bus 12 includes an originating terminal address, a desired destination terminal address, and a data word indicative of the type, i.e. either control or message.

Each BIU coupled to bus 12 continuously monitors the data slots on that bus, examining various data fields in those slots for type and other information, e.g. destination address. In general, if an address is detected which matches that of its, or one of its, associated terminals, the BIU either transfers the message data to the terminal (when the slot signal is a data type), or processes the control data internally (when the slot is a control type).

Each BIU may be assigned a set of slots in the framed sequence for the transmission of time slot signals on the inbound bus 10. In the present embodiment, sets of slots are defined in the same manner described in the incorporated reference, i.e. first slot number and slot spacing. In alternative embodiments, different time slot set designations may be utilized. The present embodiment is a dual mode system wherein a first set of the BIU/subscriber device pairs (referred to below as static slot terminals) have relatively static slot assignments where a set of slots may be uniquely assigned to a single BIU. The remaining BIU/subscriber device pairs (referred to below as contention slot terminals) have contention slot assignments where one or more slots may be assigned to a plurality of BIU's, each of which must contend for those slots. In the dual mode embodiment, time slots in a first predetermined (or static) set in the repetitive framed sequence are available for static slot assignment, e.g. to high duty cycle subscribers. The remaining time slots form a second (or contention) set and are available for assignment to a plurality of BIU's on a contention basis, and thus are well suited for subscribers whose messages are characterized by a high peak-to-average transmission rate, i.e. bursty subscribers with low duty cycle. A single BIU/subscriber device pair may act as a network controller and control the ratio of static to contention slots for the system. In alternative embodiments, this ratio may be fixed. In still other embodiments, e.g. single mode systems, all slots may be contention slots, or all slots may be static slots.

The static slot terminals are adapted to transmit signals in the static set of time slots. For the static slot terminals, the particular time slots of the static set in which any particular BIU may transmit may be varied. In addition, the right to transmit in such slots may be allocated and reallocated to various static slot terminals throughout the system. Typically, for high duty cycle subscribers, such as computers, the slot assignment is static, i.e. dedicated and time invariant. However, the static assignment can be changed by inter-terminal communication, for example, in response to a terminal-initiated request for a higher data rate, or faster mean time of access to the bus. In the present embodiment, such requests are processed in substantially the same manner as in the incorporated reference.

In addition to providing variations in static slot assignment by a single "central control" terminal, as in the incorporated reference, the present embodiment also provides at least one terminal from the set of static slot terminals which may allocate the capability to vary the communication links. This terminal may transmit an addressed control type slot signal, where the control data is representative of a primary slot allocation signal. This primary slot allocation signal includes data representative of the identity of one or more time slots in the static set in which the addressed terminal may transmit signals on the inbound bus 10, or which that addressed terminal may sub-allocate to other static slot terminals. The addressed terminal may subsequently transmit control type slot signals, with control data representative of secondary slot allocation signals which are addressed to one or more of the remaining other terminals. The secondary allocation signals may identify other time slots from the static set in which the remaining other terminals may transmit addressed control or message signals on the inbound bus 10, or may further sub-allocate those other slots. Accordingly, the various subscribers may allocate and sub-allocate various ones of the static slots, thereby permitting the modification of a static slot assignment for the respective static slot terminals on a distributed basis over the system.

Figure 2:
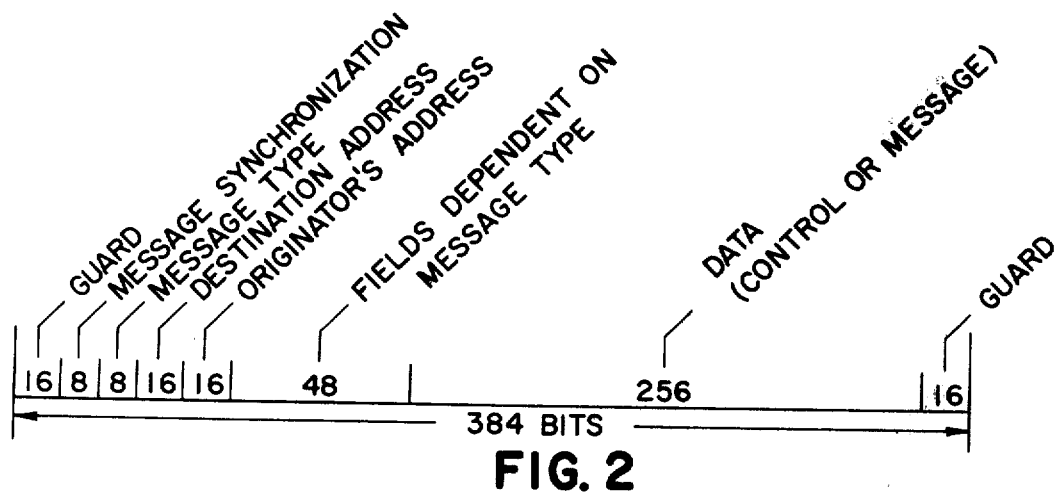
FIG. 2 shows the general message signal format for the system of FIG. 1.

The basic time slot format is illustrated in FIG. 2 for the present system, where the system data rate is 7.3728 Mbps with 16,384 slots per frame, and 384 bits per slot, 52 microseconds per slot and 0.8533 seconds per frame. As shown in FIG. 2, each slot includes 16 bit guard words at the beginning and end to accommodate mirror timing errors. An 8 bit message synchronization word (00001011) follows the first guard word, and is utilized by the BIU's for synchronization purposes in a conventional manner. The following 8 bit word is representative of a message type code. The next two 16 bit words are representative of the destination address and originator address, respectively for the time slot. Following these address words, is a 48 bit field dependent on message type, and a 256 bit data field. The slot formats are described more fully below in conjunction with FIGS. 11A-E.

Figure 3:
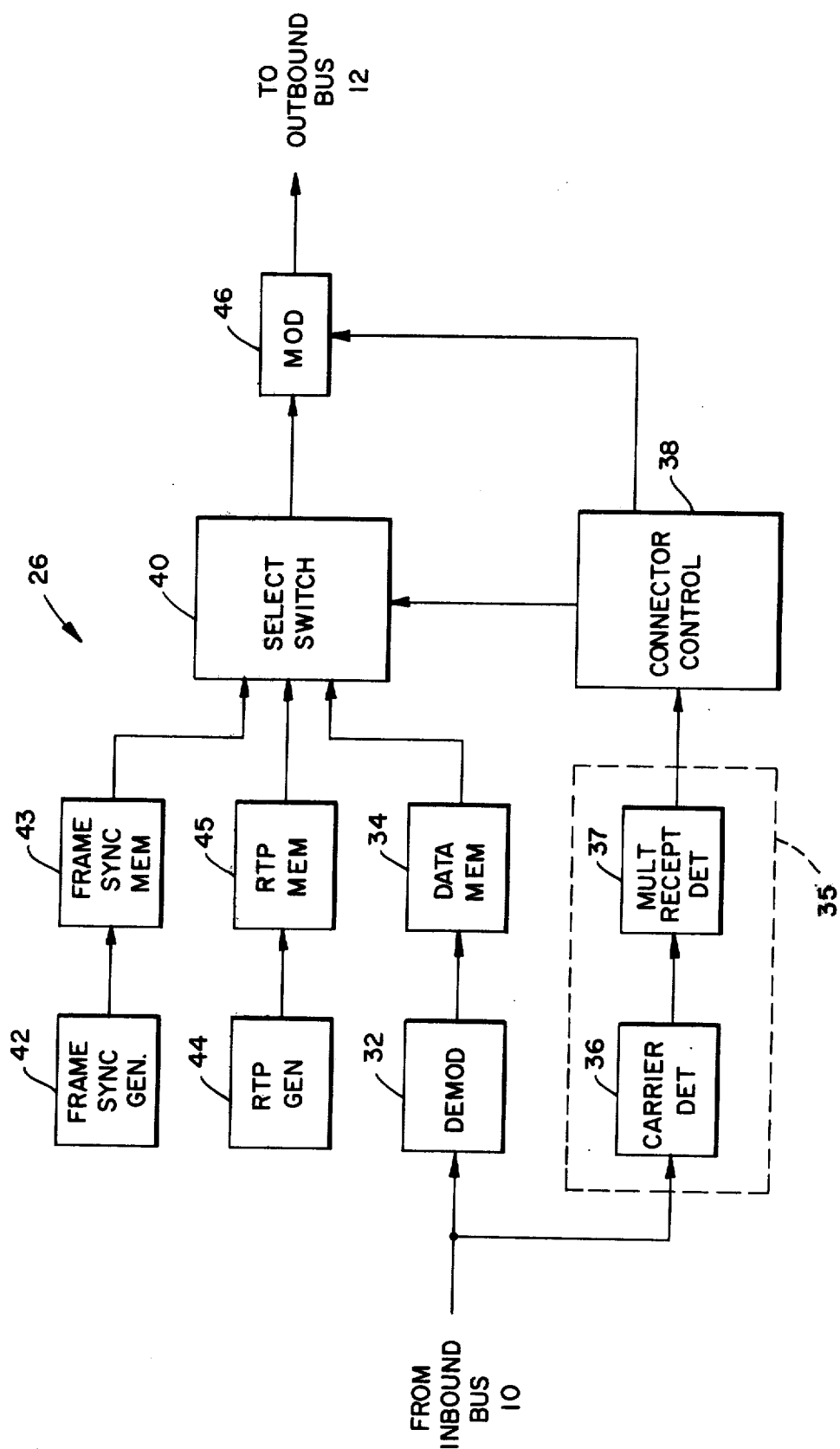
FIG. 3 shows in block diagram form an exemplary embodiment of a digital bus repeater for the system of FIG. 1.

FIG. 3 illustrates the digital bus repeater (DBR) 26 in block diagram form. The repeater 26 is coupled between the buses 10 and 12 and operates to regenerate data received from bus 10 and retransmit that data on bus 12 with new timing and interleaved with a frame synchronization slot signal. DBR 26 further includes a network for detecting when slot signals from two or more terminals occupy a single slot on bus 10, and for inhibiting the transfer of slot signals from bus 10 to bus 12 when a collision is detected. In addition, DBR 26 includes a network for generating retransmission message signals (representative of a retransmission parameter, RTP) and transmitting those signals on the outbound bus 12.

The signals from bus 10 are applied to a demodulator (and timing/data regenerator) 32 to extract baseband data and timing signals. The regenerated data signal is transferred to a dual buffer data memory 34. The signals from bus 10 are also applied to collision detection network 35. Network 35 includes carrier detector 36 and multiple reception detector 37. Detector 36 monitors the amplitude of the incoming carrier from bus 10. If there is a carrier level change during a slot period (which would result from interference of two or more carrier signals from different but simultaneously transmitting BIU's) a simultaneous transmission, or collision, condition is identified by block 37 and a control signal representative of that condition is transferred to a connector control 38.

DBR 26 also includes a frame sync generator 42 and associated dual buffer memory 43 and an RTP generator 44 and associated dual buffer memory 45. Blocks 42 and 43 and blocks 44 and 45 generate and store frame synchronization words and retransmission parameter words, respectively.

The memories 34, 43 and 45 are coupled by a select switch 40 to a modulator 46 and in turn to the outbound bus 12. The connector control 38 established the slot count for the outbound bus 12 and controls the operation of switch 40 so that slot signals are transmitted on bus 12 with a one slot delay relative to the inbound bus 10. Switch 40 is controlled to periodically apply a frame synchronization word (from memory 43) to modulator 46. When there are no collisions detected, switch 40 operates to transfer a data slot signal from memory 34 to modulator 46 in the slot on bus 12 corresponding to the slot on bus 10 in which the respective data slot signal was received. When a collision is detected for a slot, no data signal is transferred for the corresponding outbound bus 12 slot. Control 38 also periodically controls switch 40 to generate retransmit message signals (from the retransmit parameter stored in memory 45) which are used by contention terminals (as described more fully below) to control the selection of retransmission in the event of collisions. Control 38 also keys modulator 46 so that the carrier level is low for the first bit of the synchronization word of each slot.

While in present embodiment the control 38, retransmission parameter generator 44 and memory 45 are all located at DBR 26, those elements in alternative embodiments may be located elsewhere along buses 10 and 12, and coupled to those buses by a BIU, or may be remotely located but coupled by dedicated communications channels.

Figure 4:
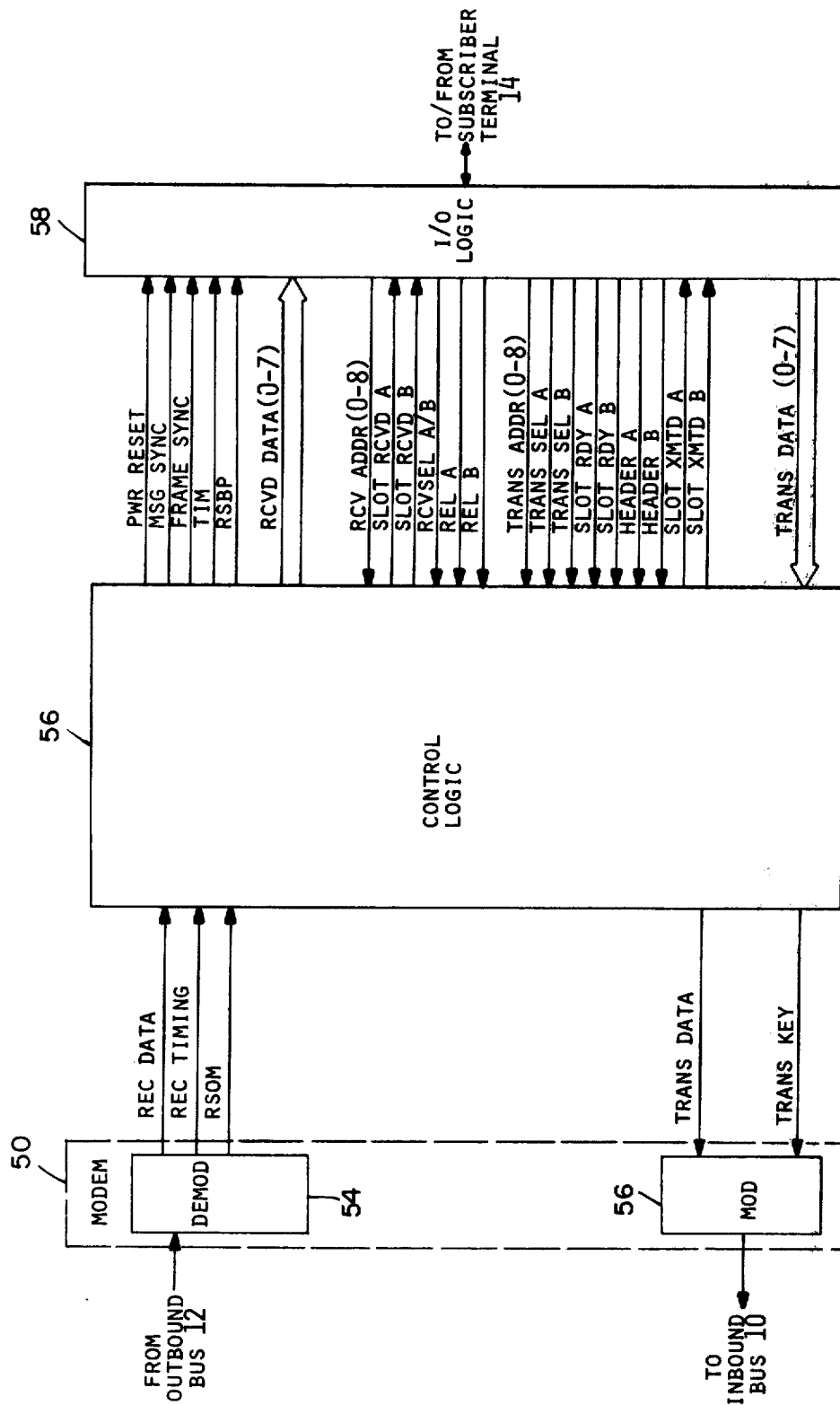
FIG. 4 shows in block diagram form an exemplary embodiment of the bus interface unit (BIU) of the system of FIG. 1.

In the present embodiment, BIU 20 is shown in block diagram form in FIG. 4. The other BIU's in the present embodiment are substantially similar to BIU 20 and thus are not described further. BIU 20 includes modem 50 having modulator 52 and demodulator 54 for coupling the associated subscriber terminal 14 to buses 10 and 12 by way of control logic 56 and input/output (I/O) logic 58. Control logic 56 establishes and maintains synchronization both with the outbound bus 12 and inbound bus 10, permitting the reception and demultiplexing of messages from bus 12 according to bit patterns in predefined locations within each time slot, and permitting the multiplexing of messages in the proper time slots on bus 10. I/O logic 58 provides electrical and operational compatibility (e.g. voltage levels, circuit resistance, and the like) between the BIU 20 and subscriber terminal 14. For operational compatibility, BIU 20 supports the mode and data rate at which the subscriber terminal 14 operates, provides serial or parallel data transfers as required, and the "hand shaking" lines required by terminal 14.

Figure 5:
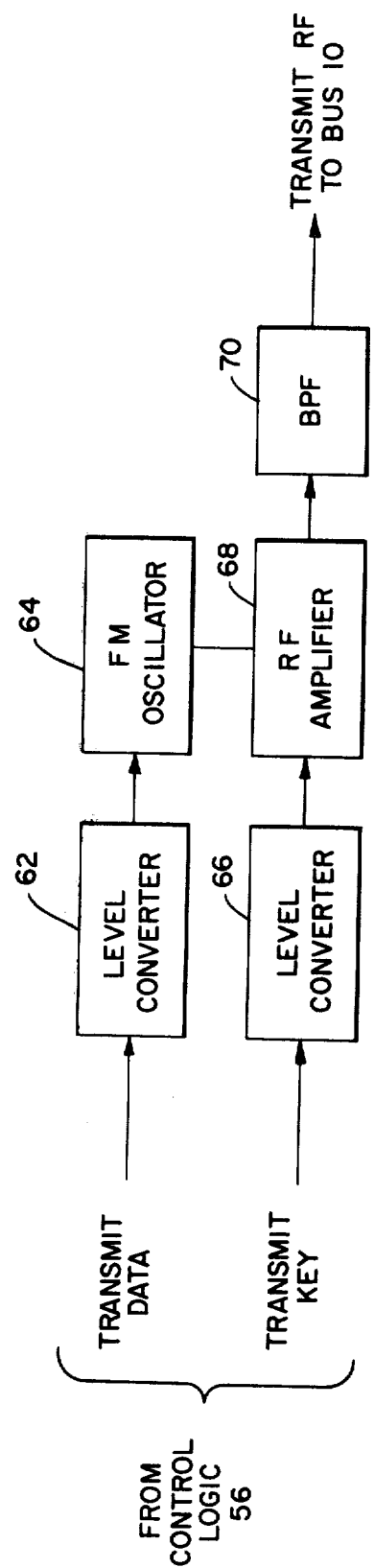
FIG. 5 shows in block diagram form an exemplary embodiment of the modulator of the BIU of FIG. 4.

In the present embodiment, the modem 50 is an FM/FSK network which operates at a center frequency of 45 MHz. The modulation index is approximately one and the transmitted signal occupies a bandwidth of 20 MHz. Modulator 52 is shown in detailed block diagram form in FIG. 5. The modulator 52 converts a 7.3728 Mbps input serial data stream from the control logic 56 into an FM/FSK signal centered at 45 MHz. The modulator includes level converter 62, FM oscillator 64, level converter 66, RF amplifier 68 and band-pass filter (BPF) 70 configured in a conventional manner. Modulator 52 transmits a signal during active conditions of the transmit key signal from control logic 56.

Figure 6:
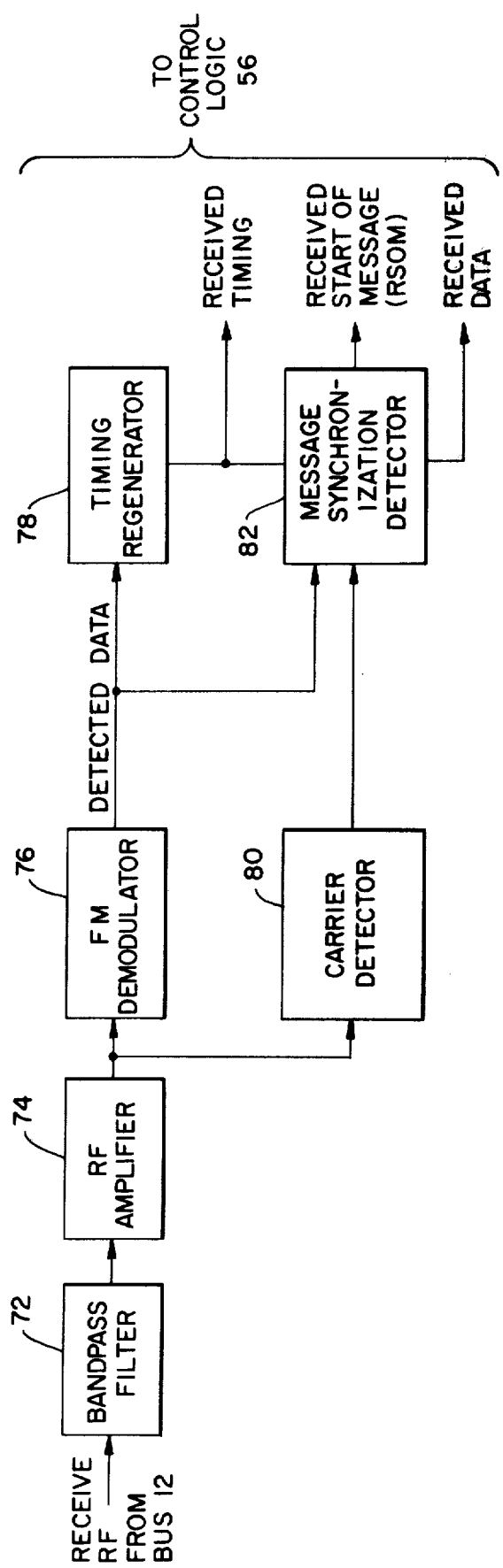
FIG. 6 shows in block diagram form an exemplary embodiment of the demodulator of the BIU of FIG. 4.

The demodulator 54 is shown in detailed block diagram form in FIG. 6. Demodulator 54 comprises band-pass filter 72, RF amplifier 74, FM demodulator 76, timing regenerator 78, carrier detector 80 and message synchronization detector 82, all configured in a conventional manner to demodulate the received RF data from bus 12 and transform that data into signals representative of the received timing, and received data, and apply these signals to the control logic 56. The message synchronization detector 82 provides a receive start-of-message (RSOM) signal to the control logic 56 in response to detection of the 8 bit message synchronization word in each time slot.

In operation, the signal from amplifier 74 is applied to carrier detector 80 to detect carrier presence and FM demodulator 76 to recover the data stream. After level restoration, the data signal from demodulator 76 is processed further by timing regenerator 78 and detector 82. During the synchronization word period, edges of the received data signals are used to phase a receive clock within regenerator 78 so that negative transitions of the clock signal will occur in the center of data bits. The data is then entered into a 2-bit shift register where the first presence of two adjacent ones after a positive transition of carrier level causes the generation of the RSOM pulse.

Figure 7:
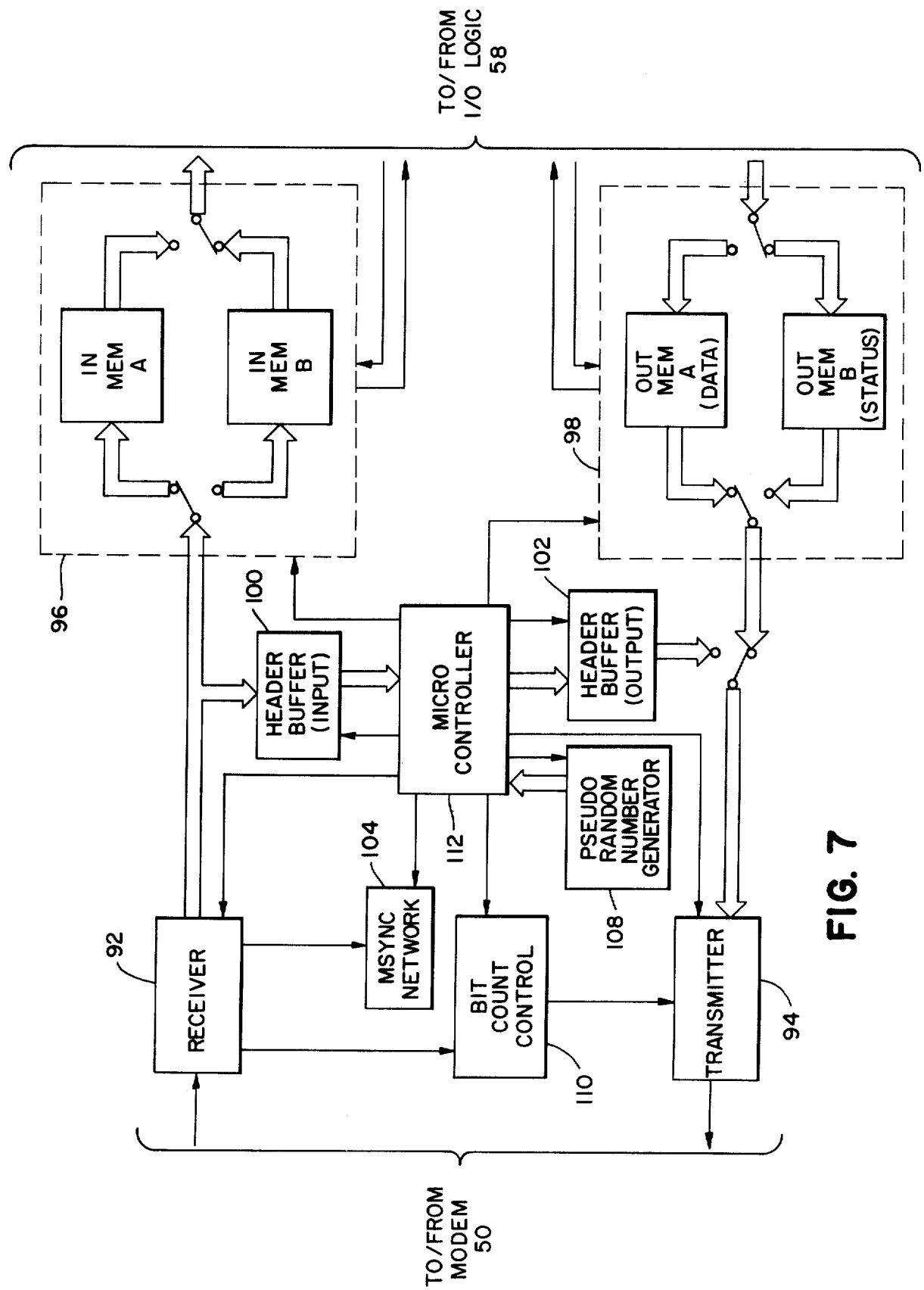
FIG. 7 shows a block diagram form an exemplary embodiment of the control logic of the BIU of FIG. 4.

The control logic 56 of a BIU is shown in detailed form in FIG. 7, and includes receiver 92, transmitter 94, buffer memories 96 and 98, header buffers 100 and 102, message sync (MSYNC) network 104, pseudo random number generator 108, and bit count control 110, all coupled to a microcontroller 112 by control and status lines. The header buffers 100 and 102 include forty-eight 16 bit words of random access memory controlled by microcontroller 112. In FIG. 7, the double line arrows are representative of data buses and the single line arrows are representative of control and status lines.

In operation, the serial data received from the demodulator 54 is converted into 8 or 16-bit words by the receiver 92. All of the 8-bit words of each slot on the bus 12 are stored in one of the two buffers (IN Mem A or IN Mem B) of buffer memory 96. The availability of these buffers is controlled by a BIU register control in I/O logic 58, as described more fully below. The first seven 16-bit words comprise the header portion of every received slot, and are also stored in the input header buffer 100 for processing by the microcontroller 112. MSYNC network 104 maintains message synchronization in a conventional manner and the bit count control 110 includes receive and transmit bit counters.

The transmitter 94 controls the transmission of messages in the assigned slots. The data for transmission is obtained from the output header buffer 102 and the buffers (OUT Mem A or Out Mem B) of memory 98. The data in the output header buffer 102 is generated by the microcontroller 112 while the I/O logic 58 loads the OUT Mem A and OUT Mem B data. In the present embodiment, the header portion of a transmit slot is generated by control logic 56, except guard bits, message synchronization code, and the twelve most significant bits of the originator's address. Alternatively, the header portion may be generated by I/O logic 58.

The pseudo random number generator 108 consists of a free running counter that provides a 16-bit number to the microcontroller 112 (to be used for random delay for retransmission in contention slots).

Figure 8:
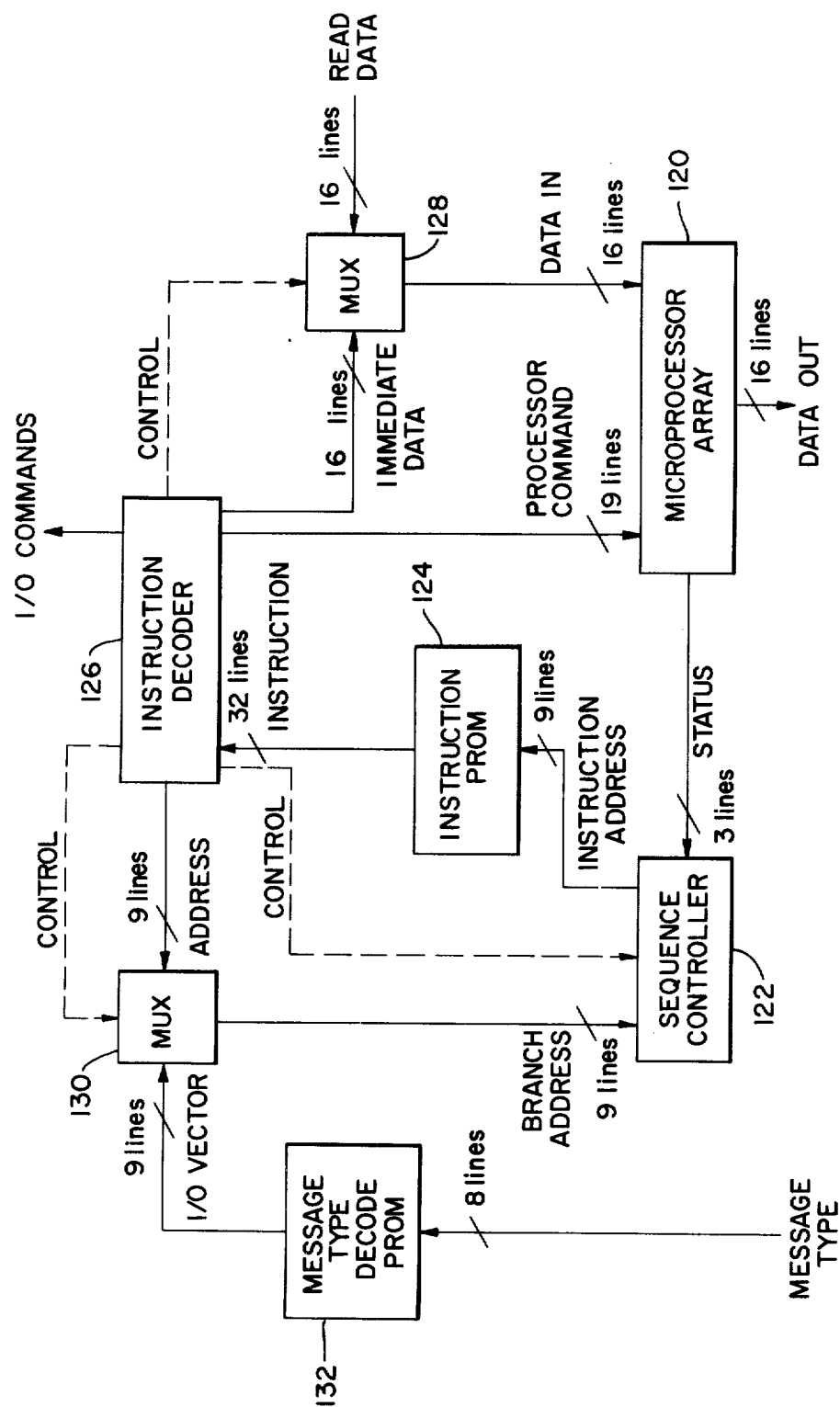
FIG. 8 shows in block diagram form an exemplary embodiment of the microcontroller of the control logic of FIG. 7.

The microcontroller 112 is a microprocessor based module that controls the operation of the control logic 56 and is shown in detailed form in FIG. 8. In the present embodiment, microcontroller 112 includes an array 120 of four 4-bit microprocessor slices (four Advanced Micro Devices Type AMD2901 units), sequence controller 122 (Signetics Type 8X02), instruction PROM 124 (eight Signetics Type 82S131 units ), instruction decoder 126 (Signetics Type 74S series logic units), multiplexer 128 (four Signetics Type 82S129 units), multiplexer 130 (three Signetics Type 93S151 units), and message type decode PROM 132 (two Signetics Type 82S129 units). The microcontroller 112 is conventionally configured so that each instruction may be executed in one 320 nanosecond cycle. The data words are 16-bits wide and the instructions are 32-bits wide. The instruction storage in this configuration has a maximum of 512 32-bit instructions and is expandable to 1024, if required. The microcontroller 112 includes sixteen 16-bit registers on the microprocessor slices.

With this configuration, in operation, the instruction from the instruction PROM 124 is decoded by the instruction decoder 126 which generates all the commands and the control signals for blocks 92, 94, 96, 98, 100, 102, 104, 108 and 110. The instruction decoder 126 also provides the immediate data and the branch address for immediate and branch instructions, respectively. The microprocessor array 120 performs the arithmetic and the logic functions on the contents of internal general registers. The general registers may be loaded with the immediate data or the data read in from the header buffer 100. The array 120 generates a 16-bit data word and a 3-bit status word as a result of a processor arithmetic/logic function. The output data word is loaded into the header buffer 102 under control of the instruction decoder 126. The status word and the branch address is used by the sequence controller 122 to generate the next instruction address. The branch address may be the output of the message type decode PROM 132 or may be provided by the instruction. The decode PROM 132 consists of branch addresses to subroutines to process different received message types as determined from the 8-bit message type word in the header field provided by header buffer 100 for a slot.

Figure 9:
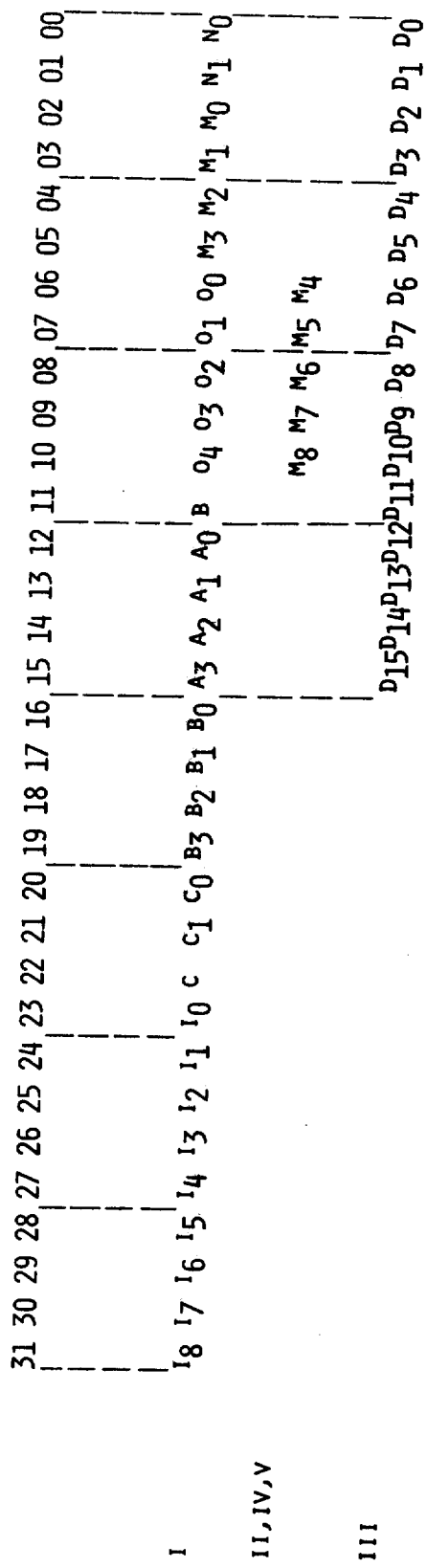
FIG. 9 shows the instruction format for the microcontroller of FIG. 8.

The 32-bit instructions executed by the microcontroller 112 are divided into five groups having the format shown in FIG. 9. Group I instructions are register-to-register instructions. The next instruction is skipped if the test condition is satisfied and the instruction is a command for rest of the control logic 56 (e.g. enable transmit). Group II instructions are register-to-register instructions with a branch to an address given in the instruction or the I/O vector if the test condition is satisfied. Group III instructions are immediate instructions wherein the sixteen least significant bits include immediate data. Group IV instructions enable the microprocessor array 120 to read a 16-bit word from the receiver header buffer 100, into one of its general registers. A skip may also be executed if the test condition is satisfied. Group V instructions are register-to-register instructions in which the processor output may be written into a storage device such as the transmit header buffer. A skip may also be executed if the test condition is satisfied.

The instruction execution time is 320 nanoseconds. This execution time is divided into eight periods of 40 nanoseconds (shown in FIG. 10) during which four functions are performed. The four functions are denoted A, B, C or C* and D and are shown in Table I:

TABLE I

Function A—NEXT INSTRUCTION ADDRESS READY-START FETCH
Function B—INSTRUCTION READY
Function C—SET UP DATA AT PROCESSOR INPUT (EXCEPT READ M8-M0)
Function C*—SET UP DATA AT PROCESSOR INPUT (READ M8-M0 ONLY)
Function D—PROCESSOR OUTPUT READY When an instruction from the instruction PROM 124 is ready at $T_B$, then that instruction is decoded in the time from $T_B$ to $T_C$. In the time from $T_C$ or $T_{C^*}$ to $T_D$, the microprocessor array 120 executes its command; and at $T_D$, output data and status words from microprocessor array 120 are ready. In the time from $T_D$ to $T_A$, the sequence controller 122 determines the address for the next instruction to be executed. The instruction PROM 124 establishes the next instruction as ready during the time $T_A$ to $T_B$.

The microprocessor includes sixteen 16-bit registers and each of these registers is assigned a function in accordance with Table II:

TABLE II

REGISTER 0—WORKING REGISTER 0
REGISTER 1—WORKING REGISTER 1
REGISTER 2—WORKING REGISTER 2
REGISTER 3—WORKING REGISTER 3
REGISTER 4—WORKING REGISTER 4
REGISTER 5—BIU ADDRESS
REGISTER 6—TRANSMIT SLOT NUMBER B
REGISTER 7—SPACING PARAMETER B
REGISTER 8—SLOT NUMBER B
REGISTER 9—TRANSMIT SLOT NUMBER A
REGISTER A—SPACING PARAMETER A
REGISTER B—SLOT NUMBER A
REGISTER C—RETRANSMISSION PARAMETER
REGISTER D—CONTROL REGISTER
REGISTER E—TRANSMIT SLOT COUNTER
REGISTER F—RECEIVE SLOT COUNTER

Registers 6 through C are used for the transmit slot determination. In the present embodiment, registers 7, 8, A, B and C are preset to initial values at power on, and may be updated by messages generated by a network controller. The retransmit parameter in register C is indicative of a contention slot terminal and the desired mean time for retransmission of a slot signal following determination of a collision.

Register D has control information (e.g. synchronization).

Register E and F remain current slot counts. The value in register E is offset from that in register F by a slot offset determined by the location of the particular BIU with respect to the Data Bus Repeater 26. Register E is used to determine transmit slot opportunities and register F is used in the frame synchronization process.

Registers 0 through 4 are used as working registers by the microcontroller software. Register 5 holds the BIU address.

In addition to the sixteen general registers, the microprocessor array 120 includes a Q-register avaliable to the software.

In operation of control logic 56, the message synchronization process is required to determine where the slots start and which bit is currently being received. In achieving message synchronization, a continuously running receive bit counter in MSYNC network 104 is reset by the first receive start-of-message signal (RSOM) after power on. Control logic 56 is adapted so that a RSOM for every receive slot should occur in a six (programmable) bit window at the start of every slot as determined by the receive bit counter. If three consecutive RSOM's occur when expected, then the message synchronization condition is established. In response to two missing RSOM's in sixteen consecutive slots, network 104 establishes a loss of message synchronization condition and an interrupt is provided to microcontroller 112.

Following message synchronization, the frame synchronization process is initiated in order to determine the number of the slot being received and identify transmit opportunities. In achieving frame synchronization, the receive slot number is maintained by the microcontroller 112.

If the slot number from three consecutive frame synchronization messages matches with the receive slot number, then frame synchronization is established and transmit is enabled.

If the slot number from two-out-of sixteen consecutive frame synchronization messages does not match with the receive slot number, then a loss of frame synchronization is established and transmit is disabled.

Following the establishing of message synchronization condition, the control 56 then processes the slot signals received from the bus. Following the establishment of message synchronization, the control section 56 processes the data received from its associated subscriber terminals (through the interface provided by the I/O logic 58).

Figure 11A:
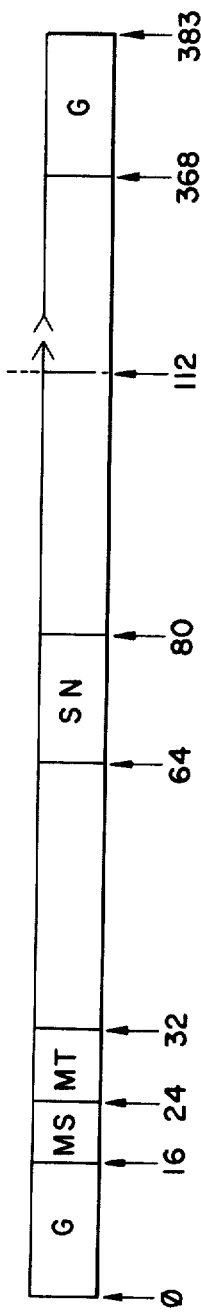
FIGS. 11A–E show exemplary message signal formats for use with the system of FIG. 1.

The slot formats for the present embodiment will now be described in detail in conjunction with FIGS. 11A-F. FIG. 11A shows the frame synchronization slot format. These slot signals are generated by the data bus repeater 26 and are utilized by control logic 56 and the control to establish and maintain frame synchronization. Table III defines the words included for the frame synchronization slot format of FIG. 11A:

TABLE III

G = GUARD BITS—ALL ZEROS
MS = MESSAGE SYNCHRONIZATION BITS = 10101011
MT = MESSAGE TYPE = $10_{16}$
SN = SLOT NUMBER

Figure 11B:
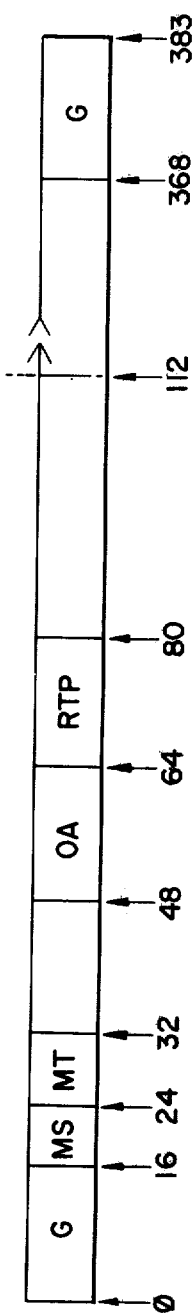

FIG. 11B shows the broadest retransmission parameter (RTP) slot format. These slot signals are generated by the network controller and are utilized by the control logic 56 to update the retransmission parameter stored in the microprocessor array 120. This parameter is used in the retransmission process for contention slots. Table IV defines the words included for the RPT slot format of FIG. 11B:

TABLE IV

G = GUARD BITS—ALL ZEROS
MS = MESSAGE SYNCHRONIZATION BITS = 00001011
MT = MESSAGE TYPE = $11_{16}$
OA = ORIGINATOR's ADDRESS
RTP = RETRANSMISSION PARAMETER

Figure 11C:
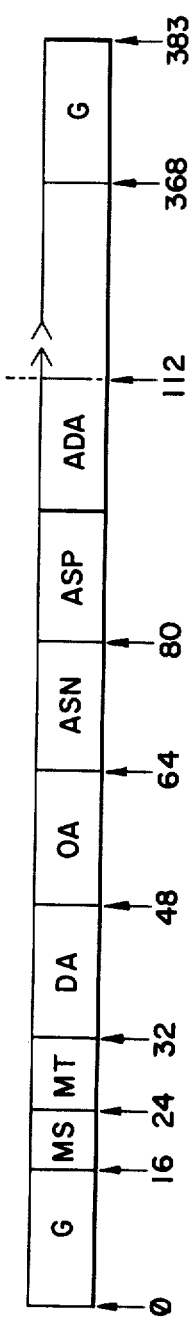

FIG. 11C shows the transmit assignment slot format. These slot signals are generated by the primary network controller or by a secondary network controller. When addressed to a BIU, the control logic 56 of that BIU updates the assigned transmit slot number, spacing parameter, and destination address currently stored therein. Table V defines the words included in the transmit assignment slot format of FIG. 11C:

TABLE V

| | |
|---|---|
| G | = GUARD BITS - ALL ZEROS |
| MS | = MESSAGE SYNCHRONIZATION BITS = 00001011 |
| MT | = MESSAGE TYPE  = $40_{16}$ FOR INDIVIDUAL STATUS SLOT ASSIGNMENT<br>= $41_{16}$ FOR CONTENTION STATUS SLOT ASSIGNMENT<br>= $42_{16}$ FOR INDIVIDUAL DATA SLOT ASSIGNMENT<br>= $43_{16}$ FOR CONTENTION DATA SLOT ASSIGNMENT |
| DA | = DESTINATION ADDRESS |
| OA | = ORIGINATOR'S ADDRESS |
| ASN | = ASSIGNED SLOT NUMBER |
| ASP | = ASSIGNED SLOT SPACING PARAMETER |
| ADA | = ASSIGNED DESTINATION ADDRESS |

Figure 11D:
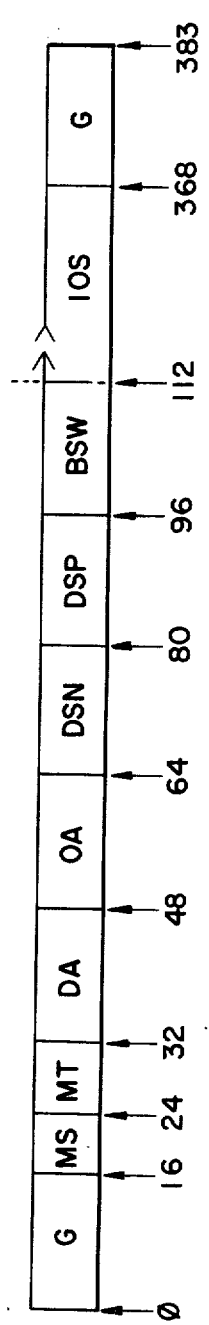

FIG. 11D shows the status slot format. These slot signals are generally generated by BIU's and addressed to BIU's or a network controller. The status slot signals include data representative of the status of either the BIU or an associated subscriber terminal. Table VI defines the words included for the status slot format of FIG. 11D:

TABLE VI

G = G = GUARD BITS - ALL ZEROS
MS = MESSAGE SYNCHRONIZATION BITS = 00001011
MT = MESSAGE TYPE = $30_{16}$
DA = DESTINATION ADDRESS
OA = ORIGINATOR'S ADDRESS
DSN = ASSIGNED DATA SLOT NUMBER

DSP=ASSIGNED DATA SLOT SPACING PARAMETER
BSW=BIU STATUS WORD
IOS=I/O STATUS

A received status slot received at a BIU is made available to the I/O logic 58.

When a status slot is to be transmitted by a BIU, the control logic 56 generates the guard bits, the message synchronization code, the twelve most significant bits of the originator's address, the assigned slot number, and the spacing parameter for the transmit data slots and a 16-bit BIU status word. The data portion of this slot is generated by the I/O and includes its status. The BIU status word (BSW) from the control logic contains bit flags indicating frame and message synchronization status, contention slot assignment or static (individual) slot assignment, and "waiting to retransmit" flags.

Figure 11E:
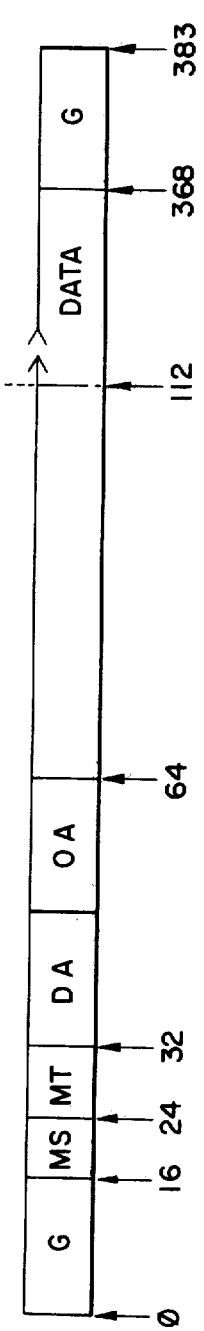

FIG. 11E shows the data slot format. These slot signals are generally generated by BIU's and addressed to BIU's (either for a standard subscriber terminal or a network controller). These signals provide data messages. Table VII defines the words included for the data slot format of FIG. 11E:

TABLE VII

G=GUARD BITS - ALL ZEROS
MS=MESSAGE SYNCHRONIZATION BITS=00001011
MT=MESSAGE TYPE=$20_{16}$
DA=DESTINATION ADDRESS
OA=ORIGINATOR'S ADDRESS

When a received data slot signal is addressed to a BIU, the data portion is made available to the associated subscriber terminal by way of I/O logic 58. When a data slot signal is to be transmitted, the control logic 56 will generate the guard bits, the message synchronization code, and the twelve most significant bits of the originator's address. Other header fields may be generated by the control logic 56 or the I/O logic 58. The data portion of the slot is always generated by the I/O logic 58.

The BIU checks the originator's address of every received slot signal that corresponds to a slot signal transmitted by that BIU. If the originator's address in the received slot signal matches that of the BIU, then the transmission is considered successful. If the originator's address in the received slot signal differs from that of the BIU, the retransmission process is initiated for the slot signal. For a static slot assignment BIU, the retransmission process consists of determining the next transmit opportunity and retransmitting the slot signal in an assigned slot. For a contention slot assignment BIU, the message is retransmitted in the next contention transmit slot for which the current pseudo-random number provided by generator 108 is less than the retransmission parameter (which corresponds to mean retransmission probability in the present embodiment) stored in register C of microprocessor 120.

Figure 12:
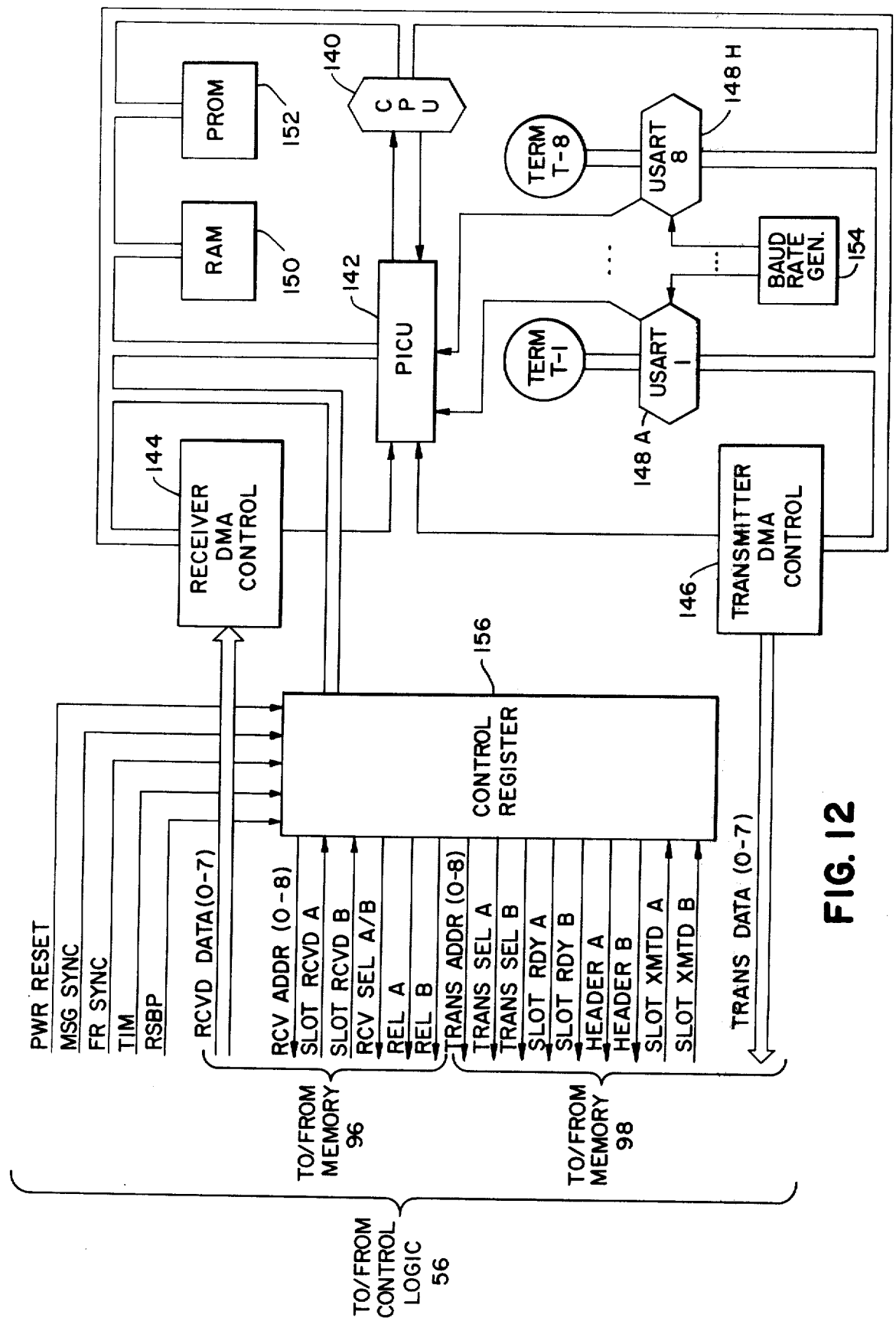
FIG. 12 shows a block diagram form an exemplary embodiment for the input/output logic of the BIU of FIG. 4.

The I/O logic 58 is shown in detailed block diagram form in FIG. 12 for the BIU 20, together with eight clustered RS-232-C subscriber terminals (denoted T-1, . . . T-8 in FIG. 13). I/O logic 58 includes central processing unit (CPU) 140 (Zilog Type Z80), priority interrupt central unit (PICU) 142 (Intel Type 8214), receiver and transmitter direct memory access controllers 144 and 146 (Intel Type 8257), respectively, eight universal synchronous/asynchronous receiver-transmitters (USART's) 148A through 148H (Intel Type 8255), random access memory (RAM) 150, PROM 152, baud rate generator 154 and BIU register control 156. The PROM 152 is programmed in accordance with Appendix II. USART's 248-H provide the direct interface between the terminals T-1 through T-8 and the I/O logic 58. The USART's are conventional software controlled devices which, in conjunction with the conventional baud rate generators and associated RS-232-C signal conversion logic accommodate asynchronous or synchronous terminal communications at up to 19.2 Kbps.

In the present embodiment, the I/O logic 58 is primarily interrupt driven and CPU 140 operates as a vectored interrupt mechanism. PICU 142 provides arbitration simultaneous interrupt requests, and in addition, blocks interrupts below a predetermined priority level. Also, the PICU 142 encodes an accepted interrupt request into an 8-bit number which CPU 140 uses as part of its vector to the appropriate interrupt service routine.

Direct memory access channels are established by controller 144 and a received data bus (RCVD DATA), and by controller 146 and a transmit data bus (TRANS DATA), thereby linking the logic bus of I/O logic 58 and memories 96 and 98 of control logic 56. BIU control register 156 further interfaces control logic 56 and the remainder of I/O logic 58. Control lines from logic control 56 provide I/O logic 58 with signals representative of power reset condition (PWR RESET), achievement of message synchronization (MSG SYNC), the achievement of frame synchronization (FR SYNC), received timing (TIM), and a receive slot boundary pulse (RSBP) indicative of the commencement of the received slot.

In addition, the input memory 96 is coupled to the BIU control register 156 by the following control lines: RCV ADDR (0-8), SLOT RCVD A, SLOT RCVD B, RCV SEL A/B, REL A, and REL B. The received data bus (RCVD DATA) transfers a byte of data from the one of input memories A or B in memory 96 which is selected by the received select line (RCV SEL A/B) at the location defined by the receive address lines (RCV ADDR). The slot received A and B signal lines (SLOT RCVD A, SLOT RCVD B) provide signals representative of the condition that a received slot signal has passed the filtering provided by control logic 56 and that the associated slot signal has been stored in the corresponding A or B input memory. The slot received signals are provided by way of the control line from microcontroller 112. A release A or B signal is provided (on the REL A or REL B lines) by the control register 156 when the data in the corresponding input memory section has been transferred to logic 58 and that memory section is available for storage of a subsequent slot signal.

The control register 156 is also coupled to the output memory 98 by the following control lines: TRANS ADDR, TRANS SEL A, TRANS SEL B, SLOT RDY A, SLOT RDY B, HEADER A, HEADER B SLOT XMTD A and SLOT XMTD B. The transmit data bus (TRANS DATA) provides a byte of transmit data to be stored in either the A or the B output memory sections selected by a write pulse on the appropriate transmit select A or B line (TRANS SEL A or TRANS SEL B) at the location defined by the signal on the transmit address lines (TRANS ADDR). The slot ready A or B lines (SLOT RDY A or SLOT RDY B) provide an indication to the microprocessor 112 that the I/O logic 58 is ready to transmit a slot signal on the respective ones of channel A or B. The slot transmitted A or B lines (SLOT XMTD A or SLOT XMTD B) provide signals initiated by the microcontroller 112 which are representative of the condition that a slot signal has been successfully transmitted from the respective A or B sections of memory 98 and has been received without collision in the corresponding slot from the outbound bus 12. The header A or B lines (HEADER A or HEADER B) provide signals indicating that the signals for the header fields of a slot signal have been provided to the corresponding A or B section of memory 98 by the I/O logic 58.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A time division multiple access communications system comprising:

a common signal path and a set of terminals coupled to said path, said set including means for establishing one or more communication links over said path between one or more of said terminals, and means for transferring digital signals between linked terminals in one or more time slots associated with said links, said time slots being in a repetitive framed sequence, each of said terminals having an associated address and including means to identify and receive correspondingly addressed digital signals on said path, wherein at least one terminal further includes means for transmitting an addressed primary slot allocation signal on said signal path in at least one of said time slots, said primary slot allocation signal being addressed to one or more other terminals and including data representative of the identity of an allocated one or more of said time slots in which said other terminals may transmit addressed signals on said path.

2. A system according to claim 1 wherein said one terminal includes means to command one or more of said other terminals to transmit an addressed signal over said path in one of said allocated time slots.

3. A system according to claim 1 wherein at least one of said other terminals further includes means for transmitting an addressed secondary slot allocation signal on said signal path in at least one of said allocated time slots, said secondary slot allocation signal being addressed to one or more of said remaining other terminals and including data representative of the identity of one or more of said allocated time slots in which said remaining other terminals may transmit addressed signals on said path.

4. A system according to claim 3 wherein said one terminal includes means to command one or more of said other terminals to transmit an addressed signal over said path in one of said allocated time slots.

5. A system according to claim 4 wherein said one other terminal includes means to command one or more of said remaining other terminals to transmit an addressed signal over said path in one of said allocated time slots.

6. A system according to claim 1 wherein said one terminal includes means for allocating predetermined numbers of time slots to selected ones of said other terminals during each of said framed sequences, said predetermined number of slots being for transmission of digital sign-on request signals by the respective ones of said selected terminals to direct said one terminal to link the requesting terminal to said signal path, said predetermined number of slots for providing said one terminal to be responsive to said sign-on request signals of the respective ones of said selected terminals during a predetermined proportion of each of said framed sequences, whereby said allocation of said predetermined number of time slots provides the respective ones of said selected terminals with a predetermined mean time for access to said signal path.

7. A system according to claim 1 wherein said other terminals include:

a service request means for transmitting a digital sign-on request signal on said path to request a communication link, said link having a requested rate, and wherein said one terminal includes:

means for receiving from requesting terminals said transmitted sign-on request signals, and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate, whereby the information capacity of said signal path is allocated to the respective ones of said requesting remote terminals in accordance with the various sign-on request signals.

8. A time division multiple access digital communications system as defined in claim 1 wherein each of said terminals include:

means for identifying a subset of time slots from a set having $2^n$ sequentially numbered time slots in a repetitive framed time sequence, where n is an integer, said subset of slots being uniquely defined by a reference slot number, fsn, which is representative of a numbered member of said subset in said framed sequence, and a slot spacing number, m, where m is an integer less than or equal to n and is representative of the spacing between members of said subset in said framed sequence, said spacing being equal to $2^m$ slots, said identifying means comprising:

a. means for generating a binary coded digital fsn signal representative of said reference slot number, fsn, b. a reference means for identifying the various ones of said set of $2^n$ sequentially numbered time slots in a repetitive framed time sequence, and for generating said sequential binary coded reference signal associated with each of the successively identified time slots, c. for comparing the m least significant bits of said successively generated reference signals with the m least significant bits of said digital fsn signal representative of said reference slot number, fsn, d. means for generating a control signal when said m least significant bits of said compared signals exactly match, and for generating no such control signal otherwise, said control signal being coincident with and identifying the members of said subset of time slots.

9. A system according to claim 3 wherein said one other terminal includes means for allocating predetermined numbers of time slots to selected ones of said other remaining terminals during each of said framed sequences, said predetermined number of slots being for transmission of digital sign-on request signals by the respective ones of said selected terminals to direct said one other terminal to link the requesting terminal to said signal path, said predetermined number of slots for providing said one other terminal to be responsive to said sign-on request signal of the respectve ones of said selected terminals during a predetermined proportion of each of said framed sequences, whereby said allocation of said predetermined number of time slots provides the respective ones of said selected terminals with a predetermined mean time for access to said signal path.

10. A system according to claim 3 wherein said remaining other terminals include:
  a service request means for transmitting a digital sign-on request signal on said path to request a communication link, said link having a requested data rate, and
wherein said one other terminal includes:
  means for receiving from requesting terminals said transmitted sign-on request signals, and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate,
whereby the information capacity of said signal path is allocated to the respective ones of said requesting remote terminals in accordance with the various sign-on request signals.

11. A time division multiple access communications system, comprising:
  A. a digital bus including a pair of oppositely-directed, unidirectional digital signal paths interconnecting a common location with one or more remote locations,
  B. a connector network at said common location and adapted to receive digital signals in one or more uniform time slots associated with the inbound path, said time slots being in a repetitive framed sequence, and further adapted to transmit corresponding digital signals in one or more corresponding time slots associated with the outbound path,
  C. a plurality of terminals, each terminal being coupled to the inbound and outbound paths at one of said remote locations, and having an associated address and
  wherein each terminal includes means to idenfity and receive correspondingly addressed digital signals in contention ones of time slots on said outbound path, and
  wherein each terminal of a first set of said terminals includes contention transmission means for transmitting addressed digital signals in contention time slots on said inbound path, and
  D. signal collision detection means including at each first set terminal:
    i. monitoring means operative following transmission of a message signal by said terminal in a contention time slot to monitor the corresponding contention time slot on said outbound path to detect the presence of a signal corresponding only to said transmitted message signal,
    ii. re-transmission means responsive to said monitoring means to re-transmit said message signal in a subsequent contention time slot only when said monitoring means fails to detect the presence of said corresponding message signal in said corresponding contention slot.

12. A system according to claim 11 wherein said signal collision detection means further includes at said connector network means to identify collision-free contention time slots on said inbound path, said collision-free time slots being characterized by the presence of a digital signal from only one first set terminal therein, and means to identify collision time slots on said inbound path, said collision time slots being characterized by the presence of a digital signal from two or more first set terminals therein.

13. A system according to claim 12 wherein said signal collision detection means further includes means to transmit corresponding digital signals on said outbound path only in response to said collision-free time slot identification.

14. A system according to claim 12 wherein said re-transmission means is operative to select said subsequent contention time slot to be separated from the original transmission time slot by a random number of time slots.

15. A system according to claim 12 wherein said signal collision detection means includes at said connector network:
  means to periodically generate and transmit re-transmit message signals on said outbound path, said re-transmit message signals being addressed to respective ones of said first set terminals, and being representative of a selected re-transmission delay for the respective first set terminals, said re-transmission delay being a multiple of the slot period, and
  wherein said re-transmission means at said respective first set terminals are responsive to the respective ones of said addressed re-transmit message signals to select said subsequent contention time slots for re-transmission of said message signal, said selected contention time slots being separated from the original transmission time slots by said selected re-transmission delay.

16. A system according to claim 15 wherein said re-transmit message signal generation means is responsive to said collision time slot identifying means to adaptively vary said re-transmit message signal for the respective ones of said first said terminals as a function of the rate of identified collision time slots for said respective terminals.

17. A system according to claim 16 wherein said re-transmit message signal is representative of a mean of a set of random numbers and wherein said selected re-transmission delay is proportional to a member of said set of random numbers.

18. A system according to claim 11 wherein said re-transmission means is operative to select said subsequent contention time slot to be separated from the original transmission time slot by a random number of time slots.

19. A system according to claim 11 wherein said signal collision detection means includes at said connector network:
 means to periodically generate and transmit re-transmit message signals on said outbound path, said re-transmit message signals being addressed to respective ones of said first set terminals, and being representative of a selected re-transmission delay for the respective first set terminals, said selected re-transmission delay being a multiple of the slot period, and
 wherein said re-transmission means at said respective first set terminals are responsive to the respective ones of said re-transmit message signals to select said subsequent contention time slots for re-transmission of said message signal, said selected contention time slots being separated from the original transmission time slots by said selected re-transmission delay.

20. A system according to claim 19 wherein said re-transmit message signal is representative of a mean of a set of random numbers and wherein said selected re-transmission delay is proportional to a member of said set of random numbers.

21. A system according to claim 11 wherein said repetitive framed sequence includes contention time slots and allocation time slots,
 wherein a second set of said terminals include means for establishing one or more communication links over said bus between one or more of said second set terminals, and means for transferring digital signals between linked second set terminals by way of inbound and outbound paths and said connector network in one or more allocation time slots association with said link, and
 wherein at least one second set terminal further includes allocation transmission means for transmitting an addressed primary slot allocation signal on said inbound path in at least one of said allocation time slots, said primary slot allocation signal being addressed to one or more other second set terminals and including data representative of the identity of an allocated one or more of said allocation time slots in which said other second set terminals may transmit addressed signals on said inbound path.

22. A system according to claim 21 wherein the sum of the number of said contention time slots and the number of said allocation time slots is a predetermined constant.

23. A system according to claim 21 further comprising means to dynamically control the number of said contention time slots and the number of said allocation time slots.

24. A system according to claim 23 wherein said dynamic control means includes means to monitor collisions in contention time slots and to transmit adjustment signals in response to changes in the ratio of said collision, and
 wherein each terminal includes means responsive to said adjustment signals to redefine said contention and allocation time slots in accordance therewith.

25. A system according to claim 23 wherein said dynamic control means includes means to monitor the utilization of said allocation time slots and to transmit adjustment signals in response to changes in said utilization, and
 wherein each terminal includes means responsive to said adjustment signals to redefine said contention and allocation time slots in accordance therewith.

26. A system according to claim 21 further comprising means to dynamically control the number of said terminals in said first and second sets.

27. A system according to claim 26 wherein said dynamic control means includes means to monitor collisions in contention time slots and to transmit adjustment signals in response to changes in the rate of said collisions, and
 wherein each terminal includes means responsive to said adjustment signals to redefine said terminal as a first or second set terminal in accordance therewith.

28. A system according to claim 26 wherein said dynamic control means includes means to monitor the utilization of said allocation time slots and to transmit adjustment signals in response to changes in said utilization, and
 wherein each terminal includes means responsive to said adjustment signals to redefine said terminal as a first or second terminal in accordance therewith.

29. A system according to claim 21 wherein said one terminal includes means to command one or more of said other terminals to transmit an addressed signal over said path in one of said allocated time slots.

30. A system according to claim 21 wherein at least one of said other terminals further includes means for transmitting an addressed secondary slot allocation signal on said signal path in at least one of said allocated time slots, said secondary slot allocation signal being addressed to one or more of said remaining other terminals and including data representative of the identity of one or more of said allocated time slots in which said remaining other terminals may transmit addressed signals on said path.

31. A system according to claim 30 wherein said one terminal includes means to command one or more of said other terminals to transmit an addressed signal over said path in one of said allocated time slots.

32. A system according to claim 31 wherein said one other terminal includes means to command one or more of said remaining other terminals to transmit an addressed signal over said path in one of said allocated time slots.

33. A system according to claim 21 wherein said one terminal includes means for allocating predetermined numbers of time slots to selected ones of said other terminals during each of said framed sequences, said predetermined number of slots being for transmission of digital sign-on request signals by the respective ones of said selected terminals to direct said one terminal to link the requesting terminal to said signal path, said predetermined number of slots for providing said one terminal to be responsive to said sign-on request signals of the respective ones of said selected terminals during a predetermined proportion of each of said framed sequences,
 whereby said allocation of said predetermined number of time slots provides the respective ones of said selected terminals with a predetermined mean time for access to said signal path.

34. A system according to claim 21 wherein said other terminals include:

a service request means for transmitting a digital sign-on request signal on said path to request a communication link, said link having a requested rate, and wherein said one terminal includes:

means for receiving from requesting terminals said transmitted sign-on request signals, and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate, whereby the information capacity of said signal path is allocated to the respective ones of said requesting remote terminals in accordance with the various sign-on request signals.

35. A time division multiple access digital communications system as defined in claim 21 wherein each of said terminals include:

means for identifying a subset of time slots from a set having $2^n$ sequentially numbered time slots in a repetitive framed time sequence, where n is an integer, said subset of slots being uniquely defined by a reference slot number, fsn, which is representative of a numbered member of said subset in said framed sequence, and a slot spacing number, m, where m is an integer less than or equal to n and is representative of the spacing between members of said subset in said framed sequence, said spacing being equal to $2^m$ slots, said identifying means comprising:

a. means for generating a binary coded digital fsn signal representative of said reference slot number, fsn, b. a reference means for identifying the various ones of said set of $2^n$ sequentially numbered time slots in a repetitive framed time sequence, and for generating said sequential binary coded reference signal associated with each of the successively identified time slots, c. for comparing the m least significant bits of said successively generated reference signals with the m least significant bits of said digital fsn signal representative of said reference slot number, fsn, d. means for generating a control signal when said m least significant bits of said compared signals exactly match, and for generating no such control signal otherwise, said control signal being coincident with and identifying the members of said subset of time slots.

36. A system according to claim 30 wherein said one other terminal includes means for allocating predetermined numbers of time slots to selected ones of said other remaining terminals during each of said framed sequences, said predetermined number of slots being for transmission of digital sign-on request signals by the respective ones of said selected terminals to direct said one other terminal to link the requesting terminal to said signal path, said predetermined number of slots for providing said one other terminal to be responsive to said sign-on request signals of the respective ones of said selected terminals during a predetermined proportion of each of said framed sequences, whereby said allocation of said predetermined number of time slots provides the respective ones of said selected terminals with a predetermined mean time for access to said signal path.

37. A system according to claim 30 wherein said remaining other terminals include:

a service request means for transmitting a digital sign-on request signal on said path to request a communication link, said link having a requested data rate, and wherein said one other terminal includes:

means for receiving from requesting terminals said transmitted sign-on request signals, and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate, whereby the information capacity of said signal path is allocated to the respective ones of said requesting remote terminals in accordance with the various sign-on request signals.

38. A system according to claim 21 wherein said signal collision detection means further includes at said connector network means to identify collision-free contention time slots on said inbound path, said collision-free time slots being characterized by the presence of a digital signal from only one first set terminal therein, and means to identify collision time slots on said inbound path, said collision time slots being characterized by the presence of a digital signal from two or more first set terminals therein.

39. A system according to claim 38 wherein said signal collision detection means further includes means to transmit corresponding digital signals on said outbound path only in response to said collision-free time slot identification.

40. A system according to claim 38 wherein said re-transmission means is operative to select said subsequent contention time slot to be separated from the original transmission time slot by a random number of time slots.

41. A system according to claim 38 wherein said signal collision detection means includes at said connector network:

means to periodically generate and transmit re-transmit message signals on said outbound path, said re-transmit message signals being addressed to respective ones of said first set terminals, and being representative of a selected re-transmission delay for the respective first set terminals, said re-transmission delay being a multiple of the slot period, and wherein said re-transmission means at said respective first set terminals are responsive to the respective ones of said addressed re-transmit message signals to select said subsequent contention time slots for re-transmission of said message signal, said selected contention time slots being separated from the original transmission time slots by said selected re-transmission delay.

42. A system according to claim 41 wherein said re-transmit message signal generation means is responsive to said collision time slot identifying means to adaptively vary said re-transmit message signal for the respective ones of said first said terminals as a function of the rate of identified collision time slots for said respective terminals.

43. A system according to claim 42 wherein said re-transmit message signal is representative of a mean of a set of random numbers and wherein said selected re-transmission delay is proportional to a member of said set of random numbers.

44. A system according to claim 21 wherein said re-transmission means is operative to select said subsequent contention time slot to be separated from the original transmission time slot by a random number of time slots.

45. A system according to claim 21 wherein said signal collision detection means includes at said connector network:
   means to periodically generate and transmit re-transmit message signals on said outbound path, said re-transmit message signals being addressed to respective ones of said first set terminals, and being representative of a selected re-transmission delay for the respective first set terminals, said selected re-transmission delay being a multiple of the slot period, and
   wherein said re-transmission means at said respective first set terminals are responsive to the respective ones of said re-transmit message signals to select said subsequent contention time slots for re-transmission of said message signal, said selected contention time slots being separated from the original transmission time slots by said selected re-transmission delay.

46. A system according to claim 45 wherein said re-transmit message signal is representative of a mean of a set of random numbers and wherein said selected re-transmission delay is proportional to a member of said set of random numbers.

* * * * *